Dec. 9, 1952   W. R. MEYER   2,620,699
CRANKSHAFT CHUCK
Filed Jan. 10, 1949   2 SHEETS—SHEET 2

INVENTOR.
WALTER R. MEYER
BY
Willard S. Grove
ATTORNEY.

Patented Dec. 9, 1952

2,620,699

UNITED STATES PATENT OFFICE 2,620,699

CRANKSHAFT CHUCK

Walter R. Meyer, Cincinnati, Ohio, assignor to The R. K. Le Blond Machine Tool Co., Cincinnati, Ohio, a corporation of Delaware Application January 10, 1949, Serial No. 70,071

1 Claim. (Cl. 82—40)

This invention pertains to crankshaft chucks for use with center drive crankshaft lathes. More particularly this invention pertains to improved supporting and clamping mechanism for a center drive crankshaft chuck.

One of the objects of this invention is to provide an improved center drive chuck supporting and clamping mechanism adapted to engage a peripheral premachined locating area on a web of a crankshaft.

Another object of this invention is to provide a fixed arcuate locating abutment in a center drive ring gear together with a fixed driving abutment and a moveable arcuate abutment for engaging a crankshaft web having a premachined peripheral locating area formed on the web of the crankshaft.

And it is a further object to provide a center drive chuck adapted to grip a crankshaft by means of premachined peripheral locating areas on the web of the crankshaft in which a maximum of clearance opening is provided in the center drive ring gear so that the crankshaft may be moved radially to an offset position in the chuck body to facilitate axial loading or unloading of the crankshaft in the center drive chuck.

Other objects and advantages of this invention will become apparent from the following description.

Figure 2:
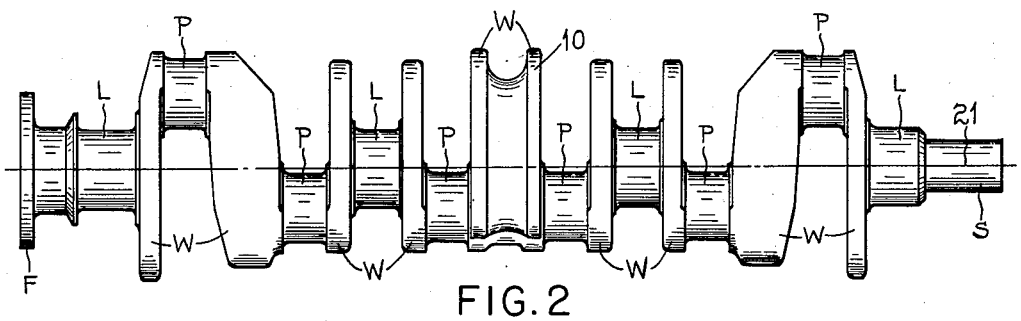
Figure 2 is an illustration of a typical crankshaft having premachined peripheral locating areas on a web thereof adapted to be gripped in a center drive chuck as shown in Figure 1.
Figure 3:
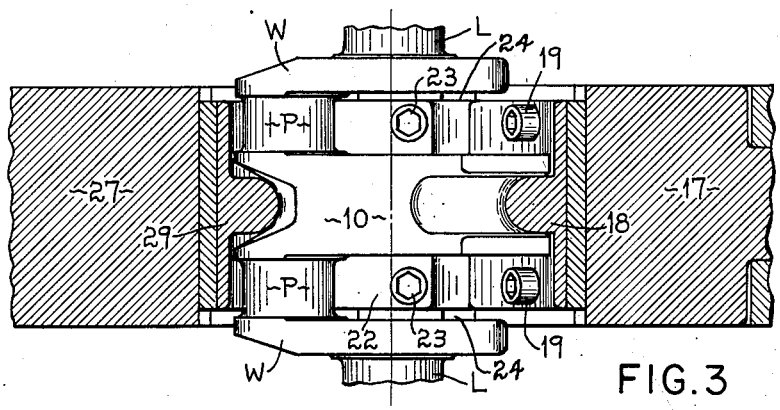
Figure 3 is a section on the line 3—3 of Figure 1.
Figures 4, 5:
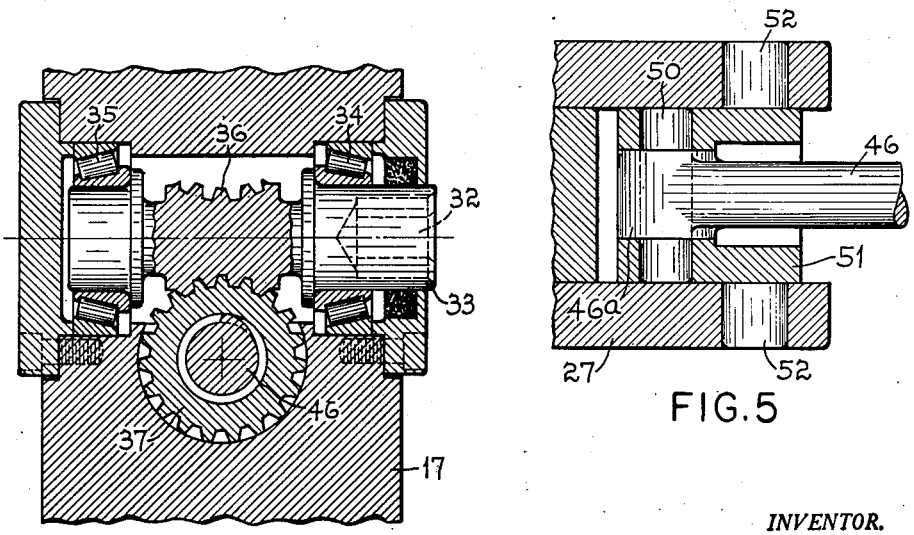
Figure 4 is a section on the line 4—4 of Figure 1.
Figure 5 is a section on the line 5—5 of Figure 1.

Referring particularly to Figure 2, there is shown a typical multi-throw crankshaft having a series of line bearings L, a flange F and a stub end S. There are a series of crankpins P which are interconnected with the line bearings L by suitable webs W. In this particular instance, the crankshaft has an intermediate web 10 on which there is provided the premachined peripheral locating areas 11 and 12 which may be machined thereon in a manner as set forth in Patent 2,141,466.

Figure 1:
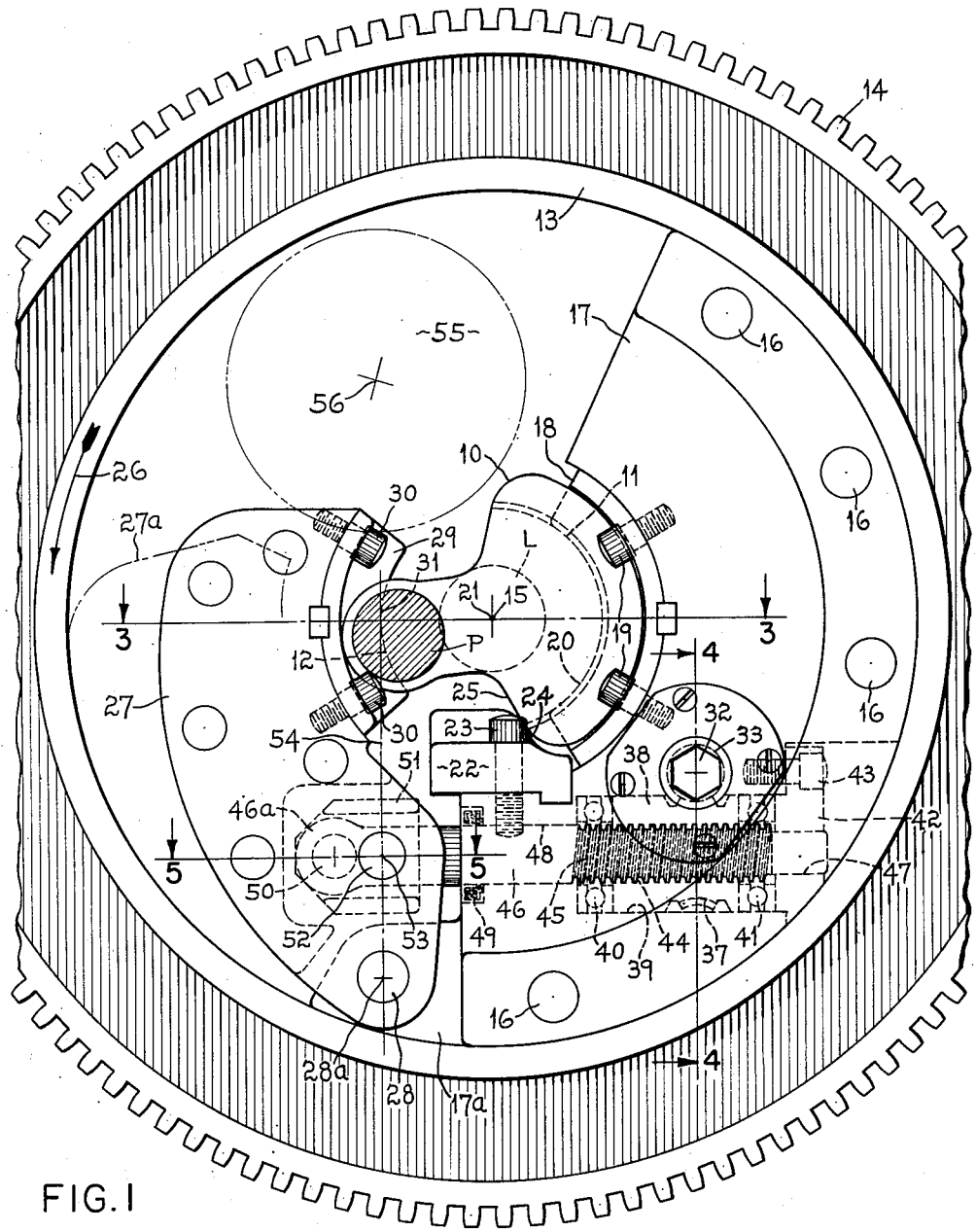
Figure 1 is a side elevation of a center drive crankshaft chuck incorporating the features of this invention.

Referring particularly to Figure 1, there is shown a center drive ring gear 13 having the usual driving gear teeth 14 and which is journaled in a well known conventional manner in a center drive housing of a center drive lathe for rotation about an axis 15. Fixed to the ring gear by suitable clamping bolts 16 is the segmental support member 17 to which is fixed the arcuate locating block 18 by suitable screws 19. The arcuate block 18 is provided with an accurately finished locating surface 20 which engages the premachined surface 11 of the crankshaft web 10 so as to position, in this case, the axis 21, Figure 2, of the line bearings L on the axis of rotation 15 of the chuck.

Also fixed on the member 17 by suitable screws 23 is the driving lug block 22 having a radially disposed abutment surface 24 adapted to engage the substantially radially disposed surface 25 of the crankshaft web 10. This provides a positive and efficient drive for rotating the crankshaft with the chuck, in a counter-clockwise direction as indicated by the arrow 26 in Figure 1.

In order to rigidly hold the crankshaft in the chuck with its premachined surface 11 in firm engagement with the surface 20, there is provided clamping mechanism comprising a clamp 27 pivotally mounted on a pin 28 carried in a lug portion 17a formed integral with the member 17. On the outer portion of the clamp 27 there is provided a second arcuate block 29 which is rigidly held to the clamp by suitable screws 30. The block 29 is provided with an arcuate surface 31 which nicely fits the premachined arcuate surface 12 on the crankshaft web 10.

The clamp 27 is actuated by placing a wrench in the operating wrench socket 32 formed in the end of worm shaft 33 which is journaled on suitable bearings 34 and 35 carried in the member 17. A worm 36 formed on the shaft 33 operatively engages a worm wheel 37 formed on a nut 38 journaled in a bore 39 formed in the member 17. The nut 38 is confined against axial movement in the member 17 by suitable thrust bearings 40 and 41 confined by a suitable plate 42 held to the member 17 by screws 43.

The nut 38 has a threaded bore 44 operatively engaging the threaded portion 45 of the screw 46 which is guided for axial movement at its rear portion in a bearing bore 47 in the plate 42 and its front portion in a bearing bore 48 which is closed off by a seal 49 through which the screw 46 projects outwardly to terminate in an enlarged eye-bolt end 46a. A pin 50 connects the eye-bolt end 46a of the screw 46 to a link member 51 having trunnions 52 which are pivotally mounted about an axis 53 in the clamp 27. Thus by rotating the worm shaft 33 by placing a wrench in the socket 32, the screw 46 may be moved axially by the nut 38 to swing the clamp 27 from released position 27a to gripping position 27 or vice versa.

In order to provide a most efficient clamping arrangement free from binding action and distortion which might otherwise cause inaccurate positioning of the crankshaft on the axis of the chuck, it will be noted that the axis of pivoting 28a of the clamp 27 and the axis 53 of the link 51 on the clamp 27 lie in the same plane indicated by the line 54 in Figure 1 and which plane is tangent to the surface 12 premachined on the crankshaft and to the surface 31 of the block 29 carried by the clamp 27. When clamp 27 is in its retracted position 27a, Figure 1, that a large radially extending clear space 55 is provided which renders the chuck accessible for moving the crankshaft radially from the axis 15 of the chuck to a position 56 of the line bearing axis 21 of the crankshaft, in which position the crankshaft may be readily moved axially into or out of the center drive gear.

While there has been described herein a preferred form of this invention, numerous changes, alterations, and substitutions of equivalents, will be obvious to those skilled in this art. The foregoing description is therefore to be taken as illustrative rather than in a limiting sense. It is desired to reserve all such changes, alterations, and substitutions as fall within the scope of the following claim.

Having now fully disclosed this invention, what is claimed as new and desired to be secured by United States Letters Patent is:

In a crankshaft chuck having a rotary chuck body, a fixed locating block having an arcuate locating surface concentric with the axis of rotation of the chuck body, a driving lug block fixed to the chuck body to one side of said locating block having a radially disposed driving surface presented toward the arcuate surface of said locating block, a clamp, a pivot pin pivotally connecting the outer end of said clamp to the chuck body, a clamping block fixed to the other inner end of said clamp having an arcuate locating surface concentric with said axis of rotation of said chuck body when moved to work engaging clamped up position, a clamping screw axially movable in said chuck in a direction at right angles to a plane tangent to the arcuate surface of said clamping block and passing through the axis of said pivot pin, a first link pin in said clamp located intermediate said pivot pin and said clamp block and having its axis parallel to the axis of said pivot pin and at the point of intersection of the axis of said clamping screw with said mentioned plane, a second link pin carried in the outer end of said clamping screw and located with its axis parallel to said first link pin and to one side of said mentioned plane, a link interconnected between said first and second pins, a nut journaled against axial movement in said chuck body operatively engaging said screw to effect axial movement thereof, and means on said chuck body to effect rotation of said nut.

WALTER R. MEYER.

REFERENCES CITED

The following references are of record in the file of this patent:

UNITED STATES PATENTS

| Number | Name | Date |
| --- | --- | --- |
| 2,242,579 | Floeter | May 20, 1941 |
| 2,247,550 | Groene | July 1, 1941 |
| 2,354,258 | Groene | July 25, 1944 |
| 2,509,888 | Schulz | May 30, 1950 |
| 2,570,964 | Meyer | Oct. 9, 1951 |